United States Patent
Huang (10) Patent No.: US 8,172,418 B2
(45) Date of Patent: May 8, 2012

(54) FRAME STRUCTURE, BACKLIGHT MODULE AND DISPLAY MODULE

(75) Inventor: Ta-Jen Huang, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 321 days.

(21) Appl. No.: 12/553,989

(22) Filed: Sep. 4, 2009

(65) Prior Publication Data

US 2010/0328927 A1 Dec. 30, 2010

(30) Foreign Application Priority Data

Jun. 30, 2009 (TW) ............................... 98122144 A (51) Int. Cl.
*G09F 13/04* (2006.01)
*G02F 1/13357* (2006.01)
*F21V 7/04* (2006.01)
(52) U.S. Cl. ........................ 362/97.1; 362/633
(58) Field of Classification Search .................. 362/606, 362/607, 618, 627, 632, 633, 559, 561, 97.1, 362/97.2, 97.3, 97.4; 349/64
See application file for complete search history.

(56) References Cited

U.S. PATENT DOCUMENTS

| | | | |
|---|---|---|---|
| 6,773,127 B2 * | 8/2004 | Kao | 362/627 |
| 7,197,227 B2 * | 3/2007 | Fan et al. | 385/147 |
| 7,380,972 B2 * | 6/2008 | Shimizu | 362/632 |
| 7,517,134 B2 * | 4/2009 | Hu | 362/633 |
| 7,543,975 B2 * | 6/2009 | Yuan et al. | 362/632 |
| 7,626,747 B2 * | 12/2009 | Murakata | 359/245 |
| 7,905,619 B2 * | 3/2011 | Iwamoto | 362/97.4 |
| 2009/0033827 A1 * | 2/2009 | Chen et al. | 349/58 |

FOREIGN PATENT DOCUMENTS

| | | |
|---|---|---|
| JP | 2007157465 | 6/2007 |
| JP | 2008009374 | 1/2008 |
| JP | 2008040096 | 2/2008 |
| TW | I261699 | 9/2006 |
| TW | I281062 | 5/2007 |
| WO | WO 2006134735 A1 * | 12/2006 |

* cited by examiner

*Primary Examiner* — David Crowe
(74) *Attorney, Agent, or Firm* — Jianq Chyun IP Office (57) ABSTRACT

A frame structure includes a frame body and fixing structures. The frame structure has an inner edge, an end edge and an outer edge. The fixing structures are disposed on two opposite sides of the frame body respectively, wherein each fixing structure includes a first protrusion, a second protrusion and a stopper portion. One end of the first protrusion or one end of the second protrusion connects to the inner and the end edges to form a containing cavity. The stopper portion is located inside the containing cavity and arranged in parallel to the first and the second protrusions. The lengths of the first and the second protrusions are respectively "$L_1$" and "$L_2$". The overlap length between the stopper portion and the first protrusion is "$\alpha$," the overlap length between the stopper portion and the second protrusion is "$b$," $L_1 > \alpha \geq 0$, and $L_2 > \beta \geq 0$.

20 Claims, 5 Drawing Sheets

FRAME STRUCTURE, BACKLIGHT MODULE AND DISPLAY MODULE

CROSS-REFERENCE TO RELATED APPLICATION

This application claims the priority benefit of Taiwan application serial no. 98122144, filed on Jun. 30, 2009. The entirety of the above-mentioned patent application is hereby incorporated by reference herein and made a part of specification.

BACKGROUND OF THE INVENTION

1. Field of the Invention

The present invention relates to a frame structure, backlight module, and display module, and more particularly to a frame structure capable of reducing light leakage and a backlight module and a display module using the frame structure.

2. Description of Related Art

With the advancement in technology comes the continuing development of display technology. Flat panel displays (FPD) which are light and thin have gradually replaced conventional cathode ray tube (CRT) displays which are heavy and thick. Common FPDs include plasma display panels (PDP) and liquid crystal displays (LCD) which are widely used in personal digital assistants (PDA), notebook computers, mobile phones, television sets, etc.

Take the LCD as an example. The LCD includes an LCD panel and a backlight module. The LCD panel includes two substrates and a liquid crystal layer disposed between the two substrates. The backlight module is formed of a frame, a light source, a light guiding plate, a plurality of optical films for providing a light source required by the LCD panel so that the LCD display is able to display images. In general, the backlight modules can be divided into two types of backlight modules, a direct type and a side incident type. The direct type backlight module is usually applied in large-sized LCDs, whereas the side incident type backlight module is usually adopted in small-sized LCDs.

Conventionally, sides of the frame of the backlight module have a plurality of holes formed thereon for positioning the optical films on the frame. The holes are capable of preventing the optical films from shifting on the frame, which, however, also causes light leakage to occur at the sides of the backlight module because of the holes on the frame. As such, the backlight module is unable to provide uniform surface light. In addition, to resolve the above problem resulted from light leakage, non-transparent adhesive tape is conventionally used to tape the holes to block leaking light. However, such taping process poses concern of the tape peeling off as well as increases manufacturing cost and time.

SUMMARY OF THE INVENTION

The present invention provides a frame structure which effectively blocks light path to thereby reduce light leakage.

The present invention provides a backlight module which adopts the above-mentioned frame structure and has better light emitting effects.

The present invention provides a display module which adopts the above-mentioned backlight module and has better display quality.

The present invention provides a frame structure which includes a frame body and a plurality of fixing structures. The frame body has an inner edge, an end edge, and an outer edge connecting with the end edge and corresponding to the inner edge. The fixing structures are respectively disposed on two opposite sides of the frame body, wherein each fixing structure includes a first protrusion, a second protrusion, and a stopper portion. One end of the first protrusion or one end of the second protrusion respectively connects to the inner edge and the end edge to form a containing cavity. The other end of the first protrusion and the other end of the second protrusion have an opening therebetween. A length of the first protrusion is $L_1$ and a length of the second protrusion is $L_2$. The stopper portion is located in the containing cavity and is arranged in parallel to the first and second protrusions, wherein the stopper portion partially overlaps or aligns with the first and second protrusions along the direction of the end edge respectively. An overlap length between the stopper portion and the first protrusion is $\alpha$, an overlap length between the stopper portion and the second protrusion is $\beta$, $L_1 > \alpha \geq 0$, and $L_2 > \beta \geq 0$.

The present invention provides a backlight module including a frame structure, a light source module, and an optical film set including a plurality of optical films. The frame structure includes a frame body and a plurality of fixing structures. The frame body has an inner edge, an end edge, and an outer edge connecting with the end edge and corresponding to the inner edge. The fixing structures are respectively disposed on two opposite sides of the frame body, wherein each fixing structure includes a first protrusion, a second protrusion, and a stopper portion. One end of the first protrusion or one end of the second protrusion connects to the inner edge and the end edge to form a containing cavity. The other end of the first protrusion and the other end of the second protrusion have an opening therebetween. A length of the first protrusion is $L_1$ and a length of the second protrusion is $L_2$. The stopper portion is located in the containing cavity and is arranged in parallel to the first and second protrusions, wherein the stopper portion partially overlaps or aligns with the first and second protrusions along the direction of the end edge respectively. An overlap length between the stopper portion and the first protrusion is $\alpha$, an overlap length between the stopper portion and the second protrusion is $\beta$, $L_1 > \alpha \geq 0$, and $L_2 > \beta \geq 0$. The light source module is located in the frame structure. The optical film set is located in the frame structure and disposed on the light source module, wherein the optical film set includes a film body and a plurality of ear structures each having a neck and an ear body. The neck connects to the film body and is correspondingly disposed in the opening of one of the fixing structures in the frame structure. The ear body connects to the neck and is correspondingly disposed in the containing cavity of the fixing structure, wherein the ear body has a hole engaging in the stopper portion in the containing cavity.

The present invention provides a display module including a display panel and a backlight module. The backlight module is located on one side of the display panel, wherein the backlight module includes a frame structure, a light source, and an optical film set. The frame structure includes a frame body and a plurality of fixing structures. The frame body has an inner edge, an end edge, and an outer edge connecting with the end edge and corresponding to the inner edge. The fixing structures are respectively disposed on two opposite sides of the frame body, wherein each fixing structure includes a first protrusion, a second protrusion, and a stopper portion. One end of the first protrusion or one end of the second protrusion connects to the inner edge and the end edge to form a containing cavity. The other end of the first protrusion and the other end of the second protrusion have an opening therebetween. A length of the first protrusion is $L_1$ and a length of the second protrusion is $L_2$. The stopper portion is located in the containing cavity and is arranged in parallel to the first and second protrusions, wherein the stopper portion partially overlaps with the first and second protrusions along the direction of the end edge respectively. An overlap length between the stopper portion and the first protrusion is $\alpha$, an overlap length between the stopper portion and the second protrusion is $\beta$, $L_1 > \alpha \geq 0$, and $L_2 > \beta \geq 0$. The light source module is located in the frame structure. The optical film set is located in the frame structure and disposed on the light source module, wherein the optical film set includes a film body and a plurality of ear structures each having a neck and an ear body. The neck connects to the film body and is correspondingly disposed in the opening of one of the fixing structures in the frame structure. The ear body connects to the neck and is correspondingly disposed in the containing cavity of the fixing structure, wherein the ear body has a hole engaging in the stopper portion in the containing cavity.

The present invention further provides a frame structure which includes a frame body and a fixing structure. The frame body has a first inner edge, a first end edge, and a first outer edge connecting with the first end edge of the frame body and corresponding to the first inner edge of the frame body. The fixing structure is disposed on the frame body and includes a first protrusion and a stopper portion. The first protrusion has an inner edge connecting with the first inner edge of the frame body; an end edge connecting with the inner edge of the first protrusion; and an outer edge connecting with the end edge of the first protrusion and the first end edge of the frame body. The stopper portion has an inner edge corresponding to the outer edge of the first protrusion; an end edge connecting with the inner edge of the stopper portion; and an outer edge connecting with the end edge of the stopper portion. The stopper portion overlaps or contacts with the first protrusion along the direction of the first end edge of the frame body. A length of the first protrusion is $L_1$, an overlap length between the stopper portion and the first protrusion is $\alpha$, and $L_1 > \alpha \geq 0$.

The present invention further provides a backlight module including any of the above-mentioned frame structures, a light source module, and an optical film set. The light source module is located in the frame structure. The optical film set is located in the frame structure and disposed on the light source module. The optical film set includes a film body and an ear structure. The ear structure includes a neck and an ear body. The neck connects to the film body and engages with the inner edge, the end edge, and the outer edge of the first protrusion. The ear body connects to the neck and has an opening engaging with the stopper portion.

The present invention further provides a display module including a display panel and the above-mentioned backlight module. The backlight module is disposed correspondingly to the display panel and the optical film set is located between the display panel and the frame structure.

According to the above, the present invention is directed at the design of the fixing structure of the frame structure, wherein by designing the length of the first protrusion to be larger than the overlap length between the stopper portion and the first protrusion and the length of the second protrusion to be larger than the overlap length between the stopper portion and the second protrusion, light path can be effectively blocked by the first protrusion, the second protrusion, and the stopper portion when light emits from the sides, thereby reducing light leakage. In addition, because the frame structure is capable of effectively reduce light leakage, the backlight module adopting the frame structure has better light emitting effect and the display module adopting the backlight module has improved display quality.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
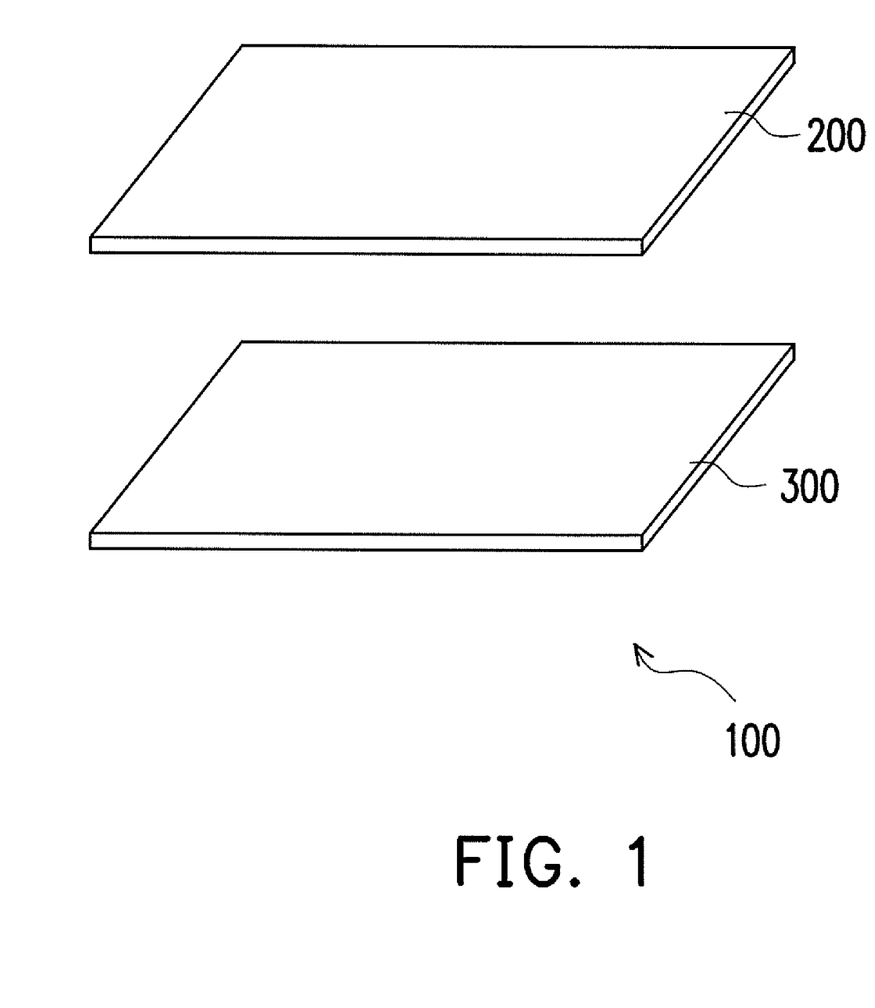
FIG. 1 is a schematic view of a display module according to an embodiment of the present invention.
Figure 2:
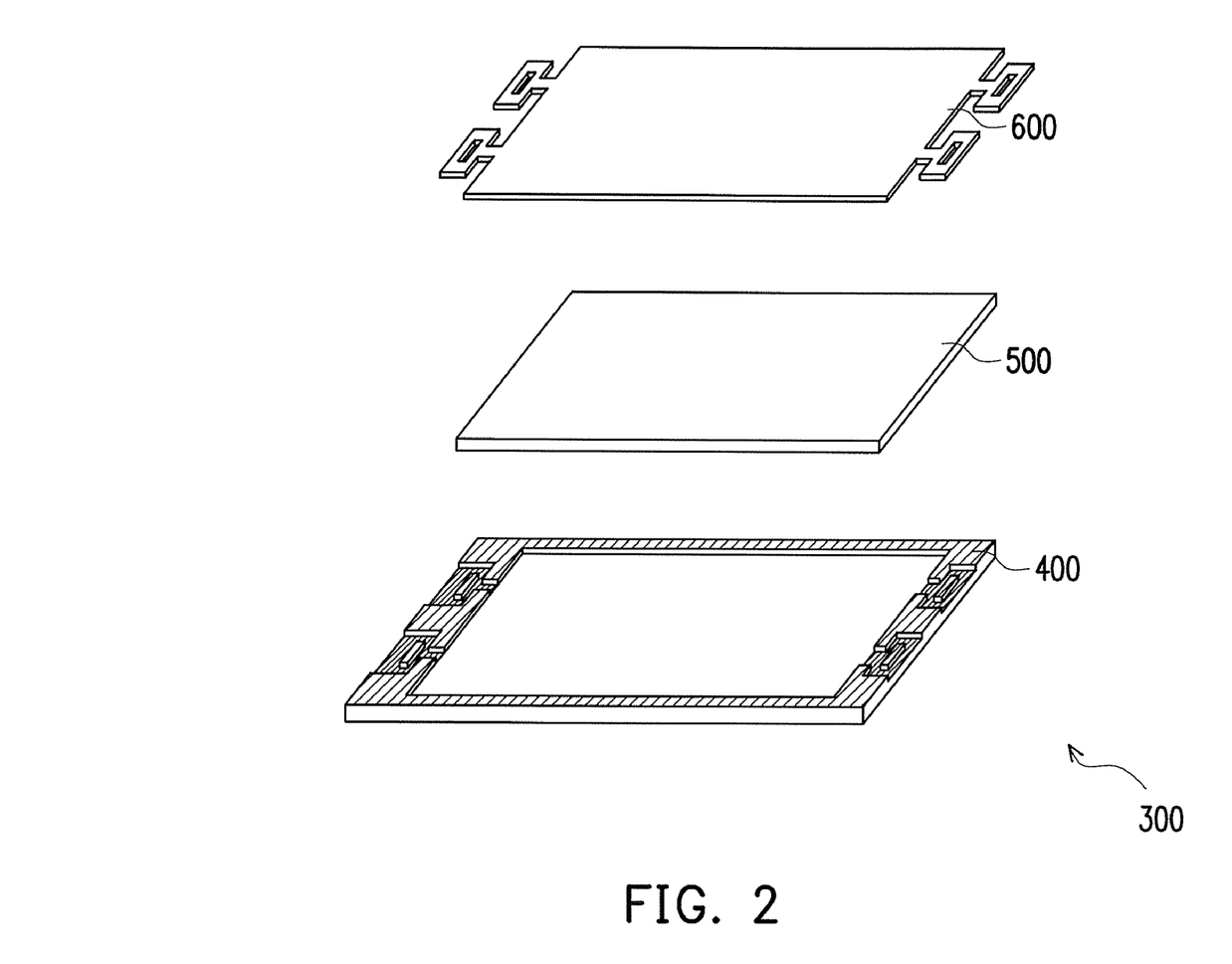
FIG. 2 is a schematic breakdown view of a backlight module of the display module in FIG. 1.
Figure 3:
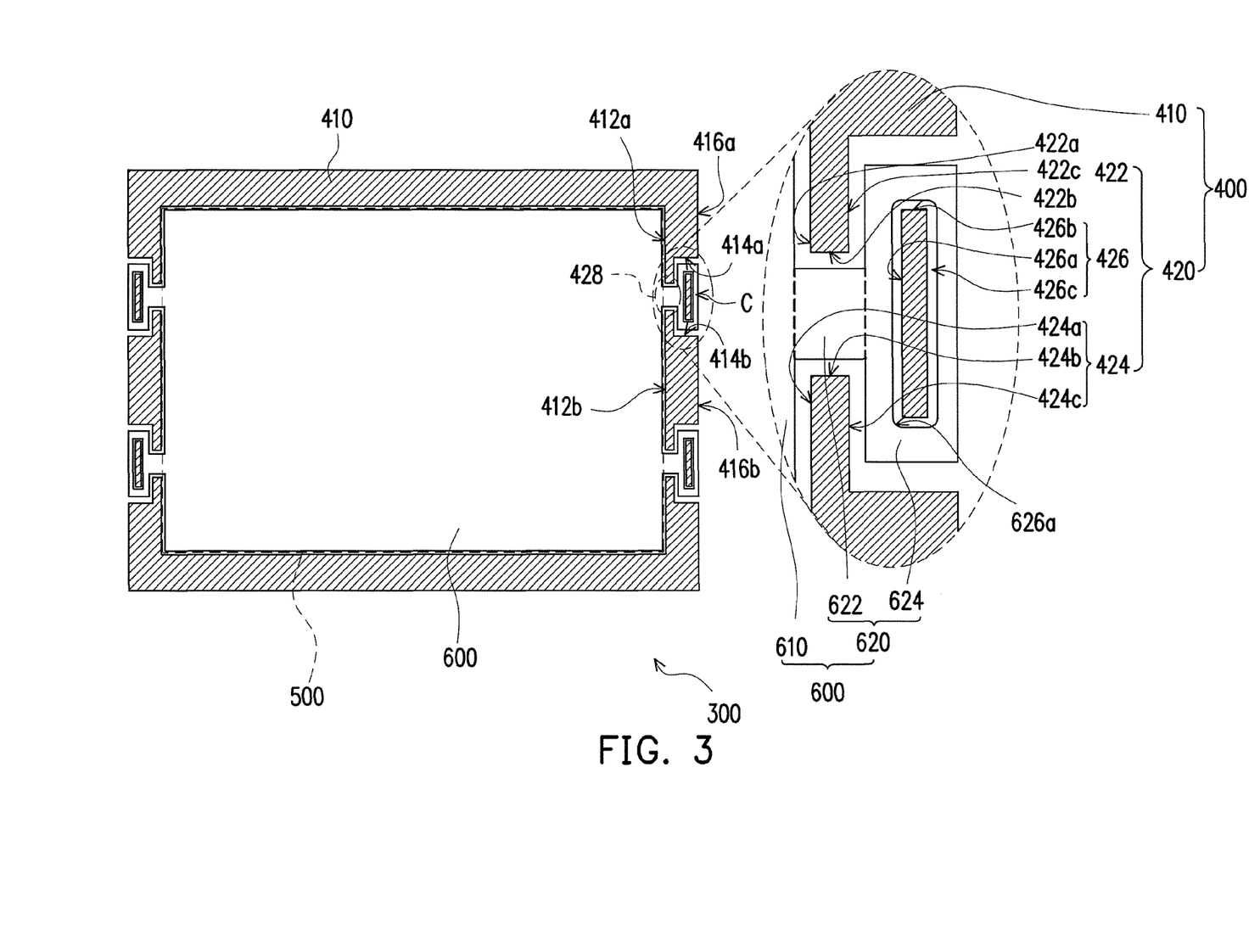
FIG. 3 is a schematic assembly view of the backlight module of the display module in FIG. 1.

FIG. 1 is a schematic view of a display module according to an embodiment of the present invention. FIG. 2 is a schematic explosion view of a backlight module of the display module in FIG. 1. FIG. 3 is a schematic assembly view of the backlight module of the display module in FIG. 1. Referring to FIGS. 1, 2, and 3 at the same time, a display module 100 includes a display panel 200 and a backlight module 300, wherein the backlight module 300 is disposed on one side of the display panel 200, for example, under the display panel 200. The backlight module 300 includes a frame structure 400, a light source module 500, and an optical film set 600, wherein the light source module 500 is located in the frame structure 400 for providing brightness to the display panel 200 to display images, the optical film set 600 is located in the frame structure 400 and disposed on the light source module 500. The optical film set 600 may include a plurality of optical films, such as a prism film, diffusion film, collecting film, brightness enhancement film, and protection film for improving distribution of surface light source so that the emitted light is more uniform and light emitting effect is further enhanced. In the present embodiment, the light source module 500 is, for example, a direct type light source module or a side incident type light source module. That is, the backlight module 300 may be a direct type backlight module or a side incident type backlight module. In addition, the display panel 200 is, for example, a liquid crystal display panel. That is, the display module 100 may be a liquid crystal display module.

Referring again to FIG. 3, the frame structure 400 of the present embodiment includes a frame body 410 and a plurality of fixing structures 420 (FIG. 3 illustrates four fixing structures). The frame body 410 has a first inner edge 412a, a second inner edge 412b, a first end edge 414a, a second end edge 414b, a first outer edge 416a, and a second outer edge 416b. The first outer edge 416a and the first end edge 414a are connected and correspond to the first inner edge 412a. The second outer edge 416b and the second end edge 414b are connected and correspond to the second inner edge 412b.

The fixing structures 420 are respectively disposed on two opposite sides of the frame body 410, wherein each fixing structure 420 includes a first protrusion 422, a second protrusion 424, and a stopper portion 426. The first protrusion 422 has an inner edge 422a connecting with the first inner edge 412a of the frame body 410; an end edge 422b connecting with the inner edge 422a of the first protrusion 422; and an outer edge 422c connecting with the end edge 422b of the first protrusion 422 and the first end edge 414a of the frame body 410. The second protrusion 424 has an inner edge 424a connecting with the second inner edge 412b of the frame body 410; an end edge 424b connecting with the inner edge 424a of the second protrusion 424; and an outer edge 424c connecting with the end edge 424b of the second protrusion 424 and the second end edge 414b of the frame body 410. The stopper portion 426 has an inner edge 426a corresponding to the outer edge 422c of the first protrusion 422 and the outer edge 424c of the second protrusion 424; an end edge 426b connecting with the inner edge 426a of the stopper portion 426; and an outer edge 426c connecting with the end edge 426b of the stopper portion 426. In the present embodiment, the frame body 410 and the fixing structure 420 may be formed as an integral structure and a material thereof may be plastic having light shielding property such as Polycarbonate (PC), Acrylonitrile Butadiene Styrene (ABS) or a combination of both.

Figure 4:
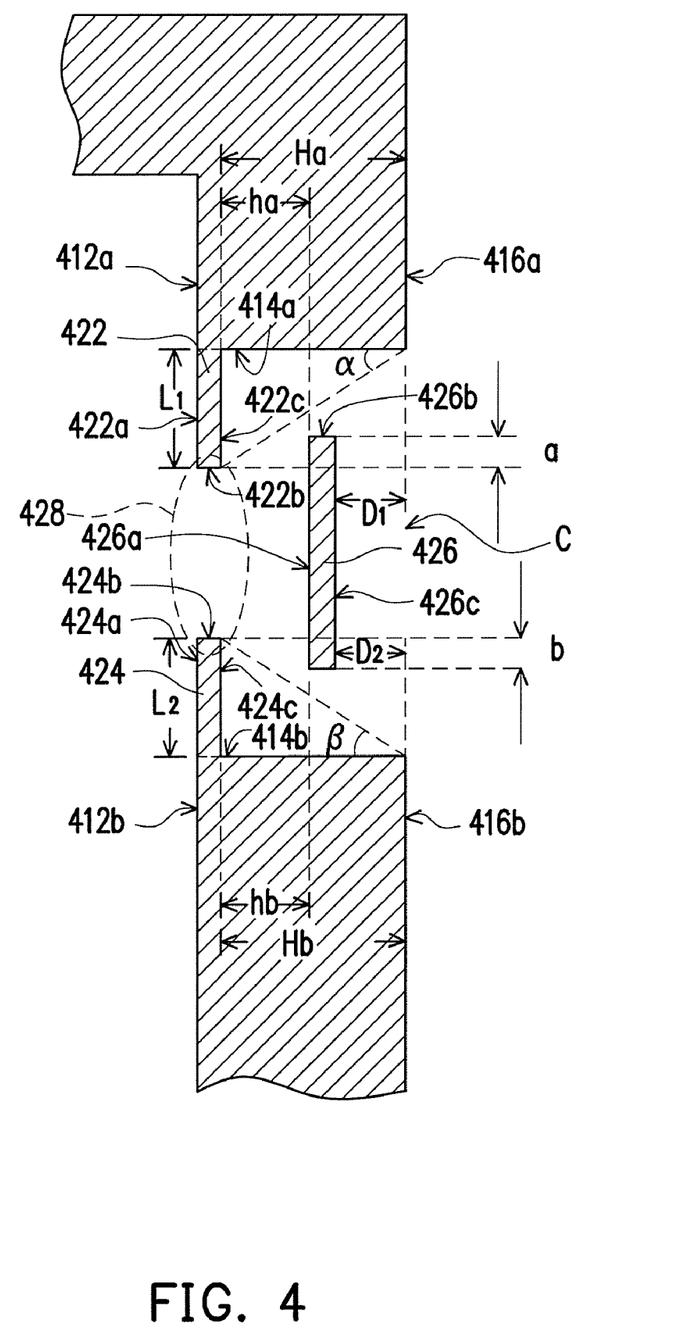
FIG. 4 is a partially enlarged schematic view of a fixing structure of the frame structure illustrated in FIG. 3.

FIG. 4 is a partially enlarged schematic view of a fixing structure of the frame structure illustrated in FIG. 3. Referring to FIG. 4, in the present embodiment, one end of the first protrusion 422 of the fixing structure 420 connect to the first inner edge 412a and the first end edge 414a, and one end of the second protrusion 424 of the fixing structure 420 connect to the second inner edge 412b and the second end edge 414b to form a containing cavity C. The other end of the first protrusion 422 and the other end of the second protrusion 424 has an opening 428 therebetween. A length of the first protrusion 422 is $L_1$ and a length of the second protrusion 424 is $L_2$. The stopper portion 426 is located in the containing cavity C and is arranged in parallel to the first protrusion 422 and the second protrusion 424, wherein the stopper portion 426 partially overlaps or aligns respectively with the first protrusion 422 and the second protrusion 424 along the directions of the first end edge 414a and the second end edge 414b. An overlap length between the stopper portion 426 and the first protrusion 422 is $\alpha$, an overlap length between the stopper portion 426 and the second protrusion 424 is $\beta$, and preferably $L_1 > \alpha \geq 0$; $L_2 > \beta \geq 0$.

The overlap length a between the stopper portion 426 and the first protrusion 422 and the overlap length b between the stopper portion 426 and the second protrusion 424 are further defined as:

$$L_1 > \alpha \geq (h_a/H_a) \times L_1$$

$$L_2 > \beta \geq (h_b/H_b) \times L_2$$

wherein $H_a$ is a distance between the first outer edge 416a of the frame body 410 and the outer edge 422c of the first protrusion 422, a range of $H_a$ is 0.1 mm to 0.5 mm; $H_b$ is a distance between the second outer edge 416b of the frame body 410 and the outer edge 424c of the second protrusion 424, a range of $H_b$ is 0.1 mm to 0.5 mm; $h_a$ is a distance between the outer edge 422c of the first protrusion 422 and the inner edge 426a of the stopper portion 426, in a preferred embodiment, $0 < h_a < H_a/2$, i.e. a range of $h_a$ is 0 mm to 0.25 mm; $h_b$ is a distance between the outer edge 424c of the second protrusion 424 and the inner edge 426a of the stopper portion 426, a preferred design range of $h_b$ is the same as that of $h_a$, i.e. $0 < h_b < H_b/2$, between the range 0 mm to 0.25 mm; $\theta_a$ is an angle formed between the first end edge 414a of the frame body 410 and a connecting line from the connection between the end edge 422b of the first protrusion 422 and the outer edge 422c of the first protrusion 422 to the connection between the first end edge 414a of the frame body 410 and the first outer edge 416a of the frame body 410; and $\theta_b$ is an angle formed between the second end edge 414b of the frame body 410 and a connecting line from the connection between the end edge 424b of the second protrusion 424 and the outer edge 424c of the second protrusion 424 to the connection between the second end edge 414b of the frame body 410 and the second outer edge 416b of the frame body 410.

In addition, the outer edge 426c of the stopper portion is located between the first outer edge 416a as well as the second outer edge 416b of the frame body 410 and the first inner edge 412a as well as the second inner edge 412b of the frame body 410, wherein the outer edge 426c of the stopper portion 426 and the first outer edge 416a of the frame body 410 have a distance D1 therebetween, the outer edge 426c of the stopper portion 426 and the second outer edge 416b of the frame body 410 have a distance D2 therebetween, and D1 and D2 are substantially equal to each other. In one preferred embodiment, the distance D1 (or the distance D2) may be designed to be the same as $h_a$ (or $h_b$), i.e. $0 < D1 < H_a/2$ (or $0 < D2 < H_b/2$) meaning the distance D1 (or D2) is the range 0 mm to 0.25 mm.

In the present embodiment, the design of the fixing structure 420 of the frame structure 400 is to make a length of the first protrusion 422 to be larger than an overlap length $\alpha$ between the stopper portion 426 and the first protrusion 422 and a length of the second protrusion 424 to be larger than an overlap length $\beta$ between the stopper portion 426 and the second protrusion 424. As such, light path can be effectively blocked by the first protrusion 422, the second protrusion 424, and the stopper portion 426 when light emitted from the light source module 500 is to pass through two sides of the frame body 410, thereby reducing light leakage. As compared to conventional technology, the frame structure 400 of the present embodiment is designed to block light leakage without using non-transparent tape to effectively reduce manufacturing cost and time and also to prevent the problem of the tape peeling off. Simply speaking, the design of the frame structure 400 of the present embodiment effectively block light path to reduce light leakage so that the backlight module 300 has better light emitting effect, which further improves display quality of the display module 100.

Referring to FIG. 3, the optical film set 600 of the present embodiment includes a film body 610 and a plurality of ear structures 620 (4 ear structures are illustrated in FIG. 3). Each ear structure 620 includes a neck 622 and an ear body 624. The neck 622 and the film body 610 are connected and are correspondingly disposed in the opening 428 of one of the fixing structures 420 of the frame structure 410. That is, the neck 622 is fastened with the inner edge 422a, the end edge 422b, and the outer edge 422c of the first protrusion 422 and the inner edge 424a, the end edge 424b, and the outer edge 424c of the second protrusion 424 of the of the fixing structure 420. The ear body 624 and the neck 622 are connected and are correspondingly disposed in the containing cavity C of the fixing structure 420, wherein the ear body 624 has a hole 626a engaging in the stopper portion 426 in the containing cavity C. In other words, the hole 626a engages with the stopper portion 426. In the present embodiment, the hole 626a of the ear body 624 is an enclosed hole, for example.

Specifically, the ear structure 620 of the optical film set 600 and the fixing structure 420 of the frame structure 400 have a space therebetween for ensuring the optical film set is assembled correctly and reserving a proper compression-expansion margin for each element. The size of the space may be adjusted according to user requirement. For example, in the present embodiment, the design of the first protrusion 422, the second protrusion 424, and the stopper portion 426 of the fixing structure 420 not only block the light path to reduce light leakage but also limit shift of the neck 622, the ear body 624, and the hole 626a of the ear structure 620 when the ear structure 620 of the optical film set 600 and the fixing structure 420 of the frame structure 400 interfere with each other. In other words, the design of the fixing structure 420 has a function of positioning the optical film set 600. At this time, the space between the ear structure 620 of the optical film set 600 and the fixing structure 420 of the frame structure 400 is preferably between the range 0.1 mm and 0.3 mm. Certainly, in other embodiments, the optical film set 600 may adopt other positioning methods.

Figure 5:
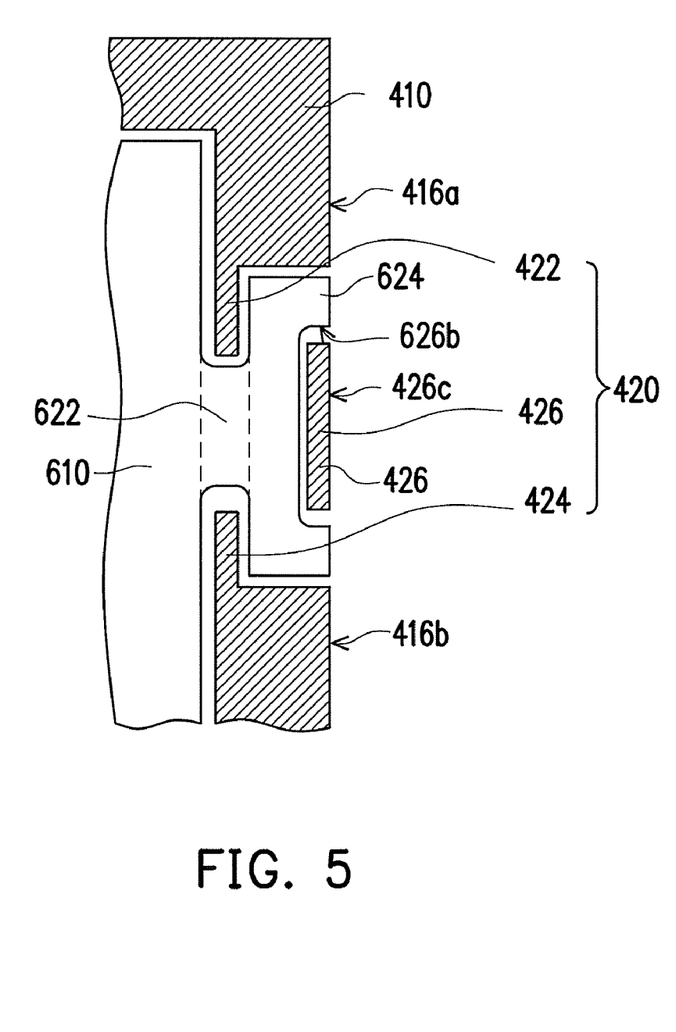
FIG. 5 is a partially enlarged schematic view of an optical film set and a frame structure according to another embodiment of the present invention.

It should be noted that the present invention does not limit the types of the frame body 410, the fixing structure 420, and the optical film set 600. Although it is illustrated herein that the outer edge 426c of the stopper portion 426 is located between the first outer edge 416a as well as the second outer edge 416b of the frame body 410 and the first inner edge 412a as well as the second inner edge 412b of the frame body 410, and the hole 626a of the ear body 624 of the optical film set 600 is an enclosed hole, in another embodiment as shown in FIG. 5, the outer edge 426c of the stopper portion 426 and the first outer edge 416a as well as the second outer edge 416b of the frame body 410 may be aligned, and at this time, the hole 626b of the ear body 624 of the optical film set 600 is a non-enclosed hole, which still falls within the technical schemes adopted by the present invention without departing from the scope of the present invention.

In addition, the fixing structure 420 as the above embodiments (FIGS. 3-5) includes a first protrusion 422, a second protrusion 424, and stopper portion 426 for illustration. However, other known structural designs capable of achieving blockage of light path to reduce light leakage such as the fixing structure 420 of the frame structure 400 including only one protrusion (the first protrusion 422 or the second protrusion 424) and the length of the protrusion (the first protrusion 422 or the second protrusion 424) being greater than the overlap length α or β between the stopper portion 426 and the protrusion (the first protrusion 422 or the second protrusion 424) still fall within the technical schemes adopted by the present invention without departing from the scope of the present invention.

In summary, the design of the fixing structure of the frame structure of the present invention lies in making the length of the first protrusion to be greater than the overlap length α between the stopper portion and the first protrusion and the length of the second protrusion to be greater than the overlap length β between the stopper portion and the second protrusion. Therefore, when light is to emit from the sides, the first protrusion, the second protrusion, and the stopper portion effectively block the light path to reduce light leakage. Furthermore, because the frame structure is able to effectively reduce light leakage, the backlight module adopting the frame structure has better light emitting effect and thus the display module using the backlight module provides more ideal display quality. Moreover, the fixing structure of the present invention has the effect of positioning the optical film set.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A frame structure for a backlight module, comprising:
a frame body having an inner edge, an end edge, and an outer edge connecting to the end edge and corresponding to the inner edge; and
a plurality of fixing structures respectively disposed on two opposite sides of the frame body, wherein each of the fixing structures comprises:
a first protrusion and a second protrusion, wherein one end of the first protrusion or one end of the second protrusion connect to the inner edge and the end edge to form a containing cavity, an opening is located between the other end of the first protrusion and the other end of the second protrusion, a length of the first protrusion is $L_1$, and a length of the second protrusion is $L_2$; and
a stopper portion located in the containing cavity and disposed in parallel to the first protrusion and the second protrusion, wherein the stopper portion partially overlaps or aligns with the first protrusion and the second protrusion along the direction of the end edge respectively, an overlap length between the stopper portion and the first protrusion is α, an overlap length between the stopper portion and the second protrusion is β, wherein the overlap lengths α and β are defined as:

$$L_1 > \alpha \geq (h_a/H_a) \times L_1$$

$$L_2 > \beta \geq (h_b/H_b) \times L_2$$

wherein $H_a$ is a distance between the outer edge of the frame body and the first protrusion, $H_b$ is a distance between the outer of the frame body and the second protrusion, and
$h_a$ is a distance between the first protrusion and the stopper portion, $h_b$ is a distance between the second protrusion and the stopper portion.

2. The frame structure according to claim 1, wherein the frame body and the fixing structures form an integral structure.

3. The frame structure according to claim 1, wherein a material of the frame body and the fixing structures is plastic having light shielding property.

4. A backlight module, comprising:
a frame structure, comprising:
a frame body having an inner edge, an end edge, and an outer edge connecting to the end edge and corresponding to the inner edge; and
a plurality of fixing structures respectively disposed on two opposite sides of the frame body, wherein each of the fixing structures comprises:
a first protrusion and a second protrusion, wherein one end of the first protrusion or one end of the second protrusion connect to the inner edge and the end edge to form a containing cavity, an opening is located between the other end of the first protrusion and the other end of the second protrusion, a length of the first protrusion is $L_1$, and a length of the second protrusion is $L_2$; and
a stopper portion located in the containing cavity and disposed in parallel to the first protrusion and the second protrusion, wherein the stopper portion partially overlaps or aligns with the first protrusion and the second protrusion along the direction of the end edge respectively, an overlap length between the stopper portion and the first protrusion is α, an overlap length between the stopper portion and the second protrusion is β, wherein the overlap lengths α and β are defined as:

$$L_1 > \alpha \geq (h_a/H_a) \times L_1$$

$$L_2 > \beta \geq (h_b/H_b) \times L_2$$

wherein $H_a$ is a distance between the outer edge of the frame body and the first protrusion, $H_b$ is a distance between the outer of the frame body and the second protrusion, and $h_a$ is a distance between the first protrusion and the stopper portion, $h_b$ is a distance between the second protrusion and the stopper portion, a light source module located in the frame structure; and an optical film set located in the frame structure and disposed on the light source module, wherein the optical film set comprises a film body and a plurality of ear structures, and each of the ear structures comprises:

a neck connecting to the film body and disposed in the opening of one of the fixing structures of the frame structure correspondingly; and an ear body connecting to the neck and disposed in the containing cavity of the fixing structure correspondingly, wherein the ear body has a hole engaging in the stopper portion of the containing cavity.

5. The backlight module according to claim 4, wherein a space is located between the ear structure of the optical film set and the fixing structure of the frame structure.

6. The backlight module according to claim 4, wherein the hole of the ear body is an enclosed hole or a non-enclosed hole.

7. A display module, comprising:

a display panel; and a backlight module located on one side of the display panel, wherein the backlight module comprises:

a frame structure, comprising:

a frame body having an inner edge, an end edge, and an outer edge connecting to the end edge and corresponding to the inner edge; and a plurality of fixing structures respectively disposed on two opposite sides of the frame body, wherein each of the fixing structures comprises:

a first protrusion and a second protrusion, wherein one end of the first protrusion or one end of the second protrusion connect to the inner edge and the end edge to form a containing cavity, an opening is located between the other end of the first protrusion and the other end of the second protrusion, a length of the first protrusion is $L_1$, and a length of the second protrusion is $L_2$; and a stopper portion located in the containing cavity and disposed in parallel to the first protrusion and the second protrusion, wherein the stopper portion partially overlaps with the first protrusion and the second protrusion along the direction of the end edge, an overlap length between the stopper portion and the first protrusion is α, an overlap length between the stopper portion and the second protrusion is β, wherein the overlap lengths α and β are defined as:

$$L_1 > \alpha \geq (h_a/H_a) \times L_1$$

$$L_2 > \beta \geq (h_b/H_b) \times L_2$$

wherein $H_a$, is a distance between the outer edge of the frame body and the first protrusion, $H_b$ is a distance between the outer of the frame body and the second protrusion, and $h_a$ is a distance between the first protrusion and the stopper portion, $h_b$ is a distance between the second protrusion and the stopper portion, a light source module located in the frame structure; and an optical film set located in the frame structure and disposed on the light source module, wherein the optical film set comprises a film body and a plurality of ear structures, and each of the ear structures comprises:

a neck connecting to the film body and disposed in the opening of one of the fixing structures of the frame structure correspondingly; and an ear body connecting to the neck and disposed in the containing cavity of the fixing structure correspondingly, wherein the ear body has an hole engaging in the stopper portion of the containing cavity.

8. The display module according to claim 7, wherein a space is located between the ear structure of the optical film set and the fixing structure of the frame structure.

9. A frame structure for a backlight module, comprising:

a frame body having a first inner edge, a first end edge, and a first outer edge connecting to the first end edge of the frame body and corresponding to the first inner edge of the frame body; and a fixing structure disposed on the frame body, the fixing structure comprising:

a first protrusion having an inner edge connecting to the first inner edge of the frame body, an end edge connecting to the inner edge of the first protrusion, and an outer edge connecting to the end edge of the first protrusion and the first end edge of the frame body; and a stopper portion having an inner edge corresponding to the outer edge of the first protrusion, an end edge connecting to the inner edge of the stopper portion, and an outer edge connecting to the end edge of the stopper portion, wherein the stopper portion partially overlaps or contacts with the first protrusion along the direction of the first end edge of the frame body, a length of the first protrusion is $L_1$, an overlap length between the stopper portion and the first protrusion is α, and the overlap length α is defined as:

$$L_1 > \alpha \geq (h_a/H_a) \times L_1$$

wherein $H_a$ is a distance between the first outer edge of the frame body and the outer edge of the first protrusion, and $h_a$ is a distance between the outer edge of the first protrusion and the inner edge of the stopper portion.

10. The frame structure according to claim 9, wherein the outer edge of the stopper portion is located between the first outer edge of the frame body and the first inner edge of the frame body.

11. The frame structure according to claim 10, wherein a distance exists between the outer edge of the stopper portion and the first outer edge of the frame body.

12. The frame structure according to claim 9, wherein the outer edge of the stopper portion is aligned with the first outer edge of the frame body.

13. The frame structure according to claim 9, wherein the frame body has a second inner edge, a second end edge corresponding to the first end edge of the frame body, and a second outer edge connecting to the second end edge of the frame body and corresponding to the second inner edge of the frame body.

14. The frame structure according to claim 13, wherein the fixing structure further comprises a second protrusion having a inner edge connecting to the second inner edge of the frame body, an end edge connecting to the inner edge of the second protrusion, and an outer edge connecting to the end edge of the second protrusion and the second end edge of the frame body, a length of the second protrusion is $L_2$, an overlap length between the stopper portion and the second protrusion is $\beta$, and $L_2 > \beta \geq 0$.

15. The frame structure according to claim 14, wherein the overlap length $\beta$ is further defined as:

$$L_2 > \beta \geq (h_b/H_b) \times L_2$$

wherein $H_b$ is a distance between the second outer edge of the frame body and the outer edge of the second protrusion, and $h_b$ is a distance between the outer edge of the second protrusion and the inner edge of the stopper portion.

16. The frame structure according to claim 13, wherein the outer edge of the stopper portion is located between the second outer edge of the frame body and the second inner edge of the frame body.

17. The frame structure according to claim 16, wherein a distance exits between the outer of the stopper portion and the second outer edge of the frame body.

18. The frame structure according to claim 13, wherein the outer edge of the stopper portion is aligned with the second outer edge of the frame body.

19. A backlight module, comprising:
a frame structure as claimed in claim 9;
a light source module located in the frame structure;
an optical film set located in the frame structure and disposed on the light source module, wherein the optical film set comprises a film body and an ear structure, and the ear structure comprises:
 a neck connecting to the film body and engaging with the inner edge, the end edge, and the outer edge of the first protrusion; and
 an ear body connecting to the neck and having a hole engaging with the stopper portion.

20. A display module, comprising:
a display panel; and
a backlight module as claimed in claim 19 disposed in correspondence to the display panel, wherein the optical film set is located between the display panel and the frame structure.

* * * * *